United States Patent
Gagnon

(10) Patent No.: US 12,305,697 B2
(45) Date of Patent: May 20, 2025

(54) JOINT ASSEMBLY FOR LINEAR ACTUATOR OF MOTION SIMULATOR

(71) Applicant: D-BOX TECHNOLOGIES INC., Longueuil (CA)

(72) Inventor: Stephan Gagnon, Laval (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 760 days.

(21) Appl. No.: 17/554,159

(22) Filed: Dec. 17, 2021

(65) Prior Publication Data

US 2022/0192382 A1 Jun. 23, 2022

Related U.S. Application Data

(60) Provisional application No. 63/126,844, filed on Dec. 17, 2020.

(51) Int. Cl.
*F16C 11/06* (2006.01)
*G09B 9/12* (2006.01)

(52) U.S. Cl.
CPC ...... *F16C 11/0647* (2013.01); *F16C 11/0695* (2013.01); *G09B 9/12* (2013.01)

(58) Field of Classification Search
CPC ...... F16B 21/18; F16B 21/183; F16B 21/186; F16C 11/0619; F16C 11/06223; F16C 11/0628; F16C 11/0633; F16C 11/0638; F16C 11/0642; F16C 11/0647; F16C 11/0695; F16C 11/0623; G09B 9/12; G09B 9/14; Y10T 403/32057; Y10T 403/32073; Y10T 403/32196; Y10T 403/32204; Y10T 403/32229

USPC .................................. 403/59, 61, 76, 77, 80
See application file for complete search history.

(56) References Cited

U.S. PATENT DOCUMENTS

| | | | | |
|---|---|---|---|---|
| 1,000,893 A | * | 8/1911 | Buckley | F16C 11/0638 403/135 |
| 1,733,599 A | * | 10/1929 | Hufferd | B62D 7/16 403/76 |
| 1,926,487 A | * | 10/1929 | Krumm | F16C 11/0647 403/319 |

(Continued)

FOREIGN PATENT DOCUMENTS

| | | | | |
|---|---|---|---|---|
| FR | 3047283 A1 | * | 8/2017 | .......... F16C 11/0619 |
| GB | 142427 A | * | 5/1920 | .......... F16C 11/0619 |

(Continued)

*Primary Examiner* — Josh Skroupa
(74) *Attorney, Agent, or Firm* — NORTON ROSE FULBRIGHT CANADA LLP

(57) ABSTRACT

A joint assembly has a housing having an inner wall surrounding an interior cavity of the housing. A slider is held captive in the interior cavity of the housing so as to define an annular volume extending radially between the slider and the inner wall of housing, the slider constrained to planar movement and a rotational degree of freedom in the housing. An annular resilient member is in the annular volume, the annular resilient member exerting a biasing force between the slider and the housing toward a neutral configuration. The housing is adapted to be connected to one of a ground/base/motion platform and a linear actuator, and the slider is adapted to be connected to the other of the ground/base/motion platform and the linear actuator.

17 Claims, 4 Drawing Sheets

(56) References Cited

U.S. PATENT DOCUMENTS

| | | | | |
|---|---|---|---|---|
| 4,063,834 A * | 12/1977 | Hanson | ............... | F16C 11/0628 |
| | | | | 403/138 |
| 4,974,802 A * | 12/1990 | Hendren | ............... | F16C 11/106 |
| | | | | 403/90 |
| 5,738,344 A * | 4/1998 | Hagman | ............... | F16C 11/106 |
| | | | | 269/20 |
| 5,957,445 A * | 9/1999 | Hagman | ............... | F16C 11/106 |
| | | | | 269/75 |
| 6,711,986 B2 * | 3/2004 | Angione | ............... | F16B 21/183 |
| | | | | 403/122 |
| 11,137,019 B2 * | 10/2021 | Rousseau | ............ | F16C 11/0685 |
| 11,293,480 B2 * | 4/2022 | Burton | ................ | F16C 11/0623 |
| 12,090,005 B2 * | 9/2024 | Chauvette | ............ | A61F 5/3761 |
| 2021/0095715 A1 * | 4/2021 | Gagnon | ............. | F16C 11/0619 |

FOREIGN PATENT DOCUMENTS

| | | | | | |
|---|---|---|---|---|---|
| GB | | 326010 A | * | 3/1930 | .......... F16C 11/0619 |
| GB | | 482799 A | * | 4/1938 | .......... F16C 11/0619 |

\* cited by examiner

JOINT ASSEMBLY FOR LINEAR ACTUATOR OF MOTION SIMULATOR

CROSS-REFERENCE TO RELATED APPLICATION

The present application claims the priority of U.S. Patent Application No. 63/126,844, filed on Dec. 17, 2020, the contents of which are incorporated herein by reference.

TECHNICAL FIELD

The present application relates to joint assemblies of the type used in motion simulators, among other uses.

BACKGROUND OF THE ART

Motion simulators typically feature a seat, platform, cabin or other user-supporting effector that is controllably movable by one or more actuated linkages. Such effectors are displaceable by the linkages as a function of a control signal received thereby. The actuated linkages may be leg-like linear actuators mounted to the ground/floor or other like fixed structure at one end, and to the effector at the other end. Mechanical joints enabling more than one degree of freedom are commonly used in the linkages of motion simulators. However, due to the complex loading conditions involved in the operation of motion simulators, the linkages may be prone to wear or to deviation from targeted displacement trajectories. Therefore, actuated linkages, for instance of the type having a spherical joint at either end, may include means to mitigate wear of the joint in certain operating conditions.

SUMMARY

In accordance with one aspect of the present technology, there is provided a joint assembly comprising: a housing having an inner wall surrounding an interior cavity of the housing, a slider held captive in the interior cavity of the housing so as to define an annular volume extending radially between the slider and the inner wall of housing, the slider constrained to planar movement and a rotational degree of freedom in the housing, and an annular resilient member in the annular volume, the annular resilient member exerting a biasing force between the slider and the housing toward a neutral configuration; wherein the housing is adapted to be connected to one of a ground/base/motion platform and a linear actuator, and the slider is adapted to be connected to the other of the ground/base/motion platform and the linear actuator.

In accordance with another aspect of the present technology, there is provided a joint assembly comprising: a housing having an inner wall surrounding an interior cavity of the housing; a slider received by the housing inward the cavity, the slider sized relative to the housing to define an annular volume extending radially between the slider and the inner wall, the slider constrained to planar movement and to one rotational degree of freedom in the housing; a stud with a proximal end connected to the slider and a distal end opposite the proximal end configured to be coupled to an actuator, the stud rotatable about its axis and the distal end is spherically displaceable relative to the slider.

Many further features and combinations thereof concerning the present technology will appear to those skilled in the art upon reading the instant disclosure.

DETAILED DESCRIPTION

Figure 1:
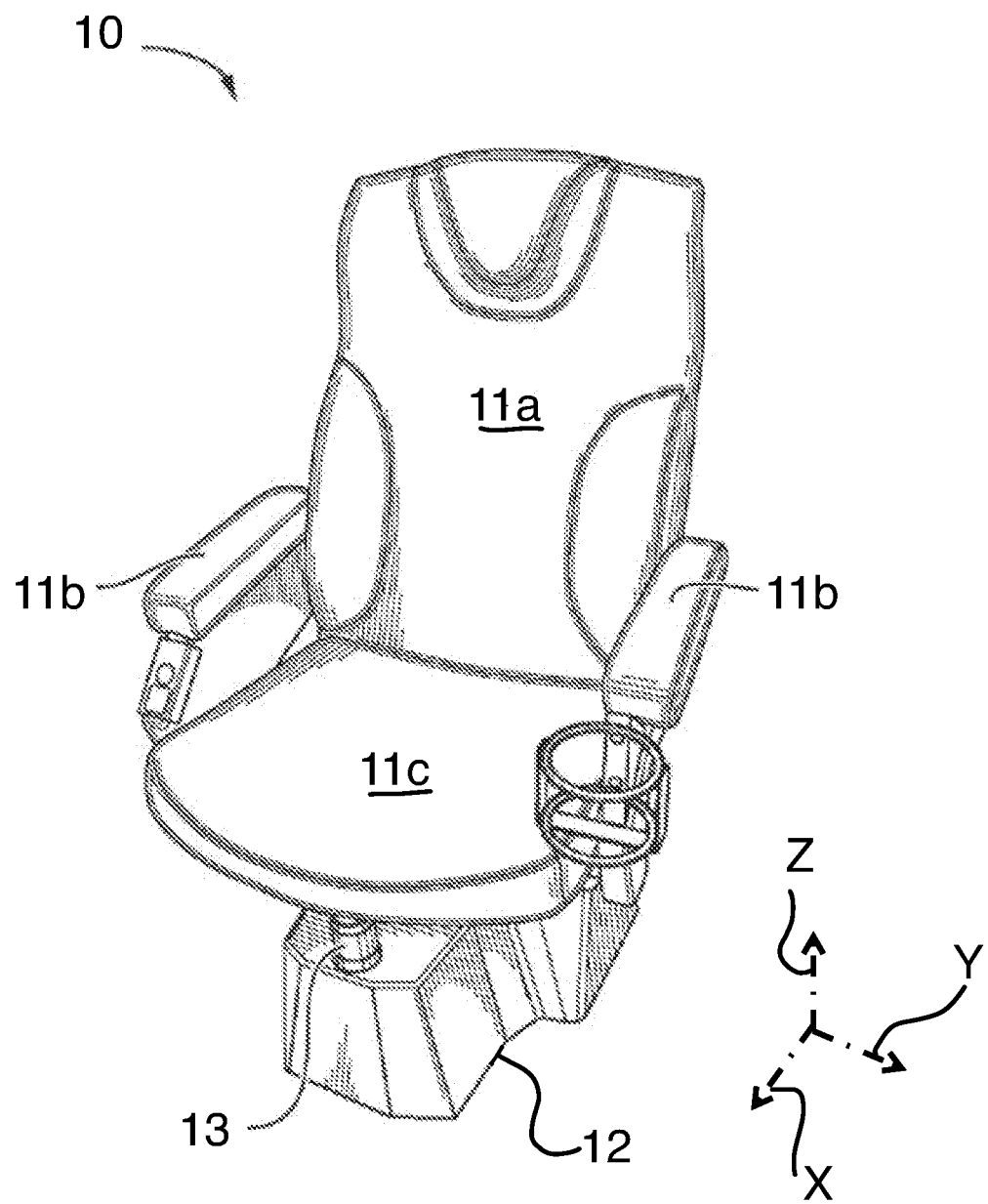
FIG. 1 is a perspective view of a motion simulator comprising an actuator assembly in accordance with the present disclosure.

With reference to the Figures, there is provided a motion simulator for inducing a desired sensory perception to a user of the motion simulator, for example a perception of motion, by means of vibro-kinetic effects (e.g., vibration, movement, orientation). The effects may be devised so as to be interpreted by the user as kinesthetic cues. Moreover, such effects may be synergistically paired with one or more sensory feeds (such as audio and/or video feeds) delivered to the user for enhancement of the sensory perception. In FIG. 1, an embodiment of a motion simulator according to an aspect of the present technology is shown at 10. The motion simulator 10 generally comprises a motion platform or effector 11 (shown as 11a, 11b, 11c in the figures, referred to as 11), in this case a chair, a support 12 in the form of a base supporting the effector 11, and an actuator assembly 13, or actuable linkages, operatively connected to the effector 11 and linked to the support 12. The effector 11 may have one or more surfaces adapted for interfacing with the user, such as a backrest/headrest 11a, armrests 11b, and seat 11c, among other possibilities. The support 12 may be mountable to a reference structure 12' such as a concrete slab, a frame, a platform, ground or other construction adapted to bear loads commensurate to a total mass of the motion simulator 10 and of the user with the effector 11 under accelerations that may be in a range between about [0, 1] G in at least one direction. In some embodiments, the support 12 is integral to the actuator assembly 13, which may be said to be mountable directly to the reference structure. One may describe the effector 11 as an end effector, or output, of the motion simulator 10 that operatively supports its user or a given load. The motion simulator 10 may be provided with one or more actuator assemblies 13, any one of which may be operable, alone or in combination, to move the effector 11 relative to the reference structure 12'.

In implementations, the motion simulator 10 may be provided as seating for a living room, a movie theater, an auditorium or a stadium, among others. The motion simulator 10 may also be provided for simulation applications, for example for inducing sensory perceptions relatable to those occurring upon operating heavy machinery such as cranes, and of various vehicles such as air, water, racetrack, all-terrain or road-borne vehicles. The effector 11 may indeed be a platform, a bench, a pod, a nacelle, a chassis, a cockpit, or even an entire vehicle as the case may be in order to realistically replicate a operating environment and/or conditions. Depending on the implementation, such motion simulators 10 may be used in professional settings such as training facilities, or in recreational settings such as themed venues (gaming centers, amusement parks, museums or the like) or even in residential gaming systems. Such motion simulators 10 may also be adapted to be used by more than one user at a time. The motion simulator 10 may be configured with one or more actuator assemblies 13 to allow and govern certain degrees of freedom to the effector 11 in three dimensions relative to the reference structure 12' by orthogonal axes X, Y and Z. For instance, depending on the configuration, the actuator assembly 13 may be controlled (and coordinated with other assemblies 13, as the case may be) to impart translation and/or rotation motion to the effector 11 with respect to the X-axis (surge, and/or roll), the Y-axis (sway and/or pitch) and/or the Z-axis (heave and/or yaw). A given actuator assembly 13 may be configured to allow three degrees of freedom to its corresponding effector 11, for example sway, surge and yaw when disposed generally horizontally (i.e., generally orthogonal to the Z-axis), and roll, pitch and heave when disposed vertically (i.e., generally parallel to the Z-axis). In some configurations, one or more actuator assemblies 13 may be oriented otherwise. Indeed, a plurality of actuator assemblies 13 (at least two, and in some cases more than six) may be positioned and oriented relative to the effector 11 to achieve desired ranges of motion, effects and load-bearing capacity. Complementary subject-matter including details pertaining to the kinematics of the motion simulator 10 may be found in U.S. Pat. No. 7,934,773, the contents of which are incorporated herein by reference.

Figure 2:
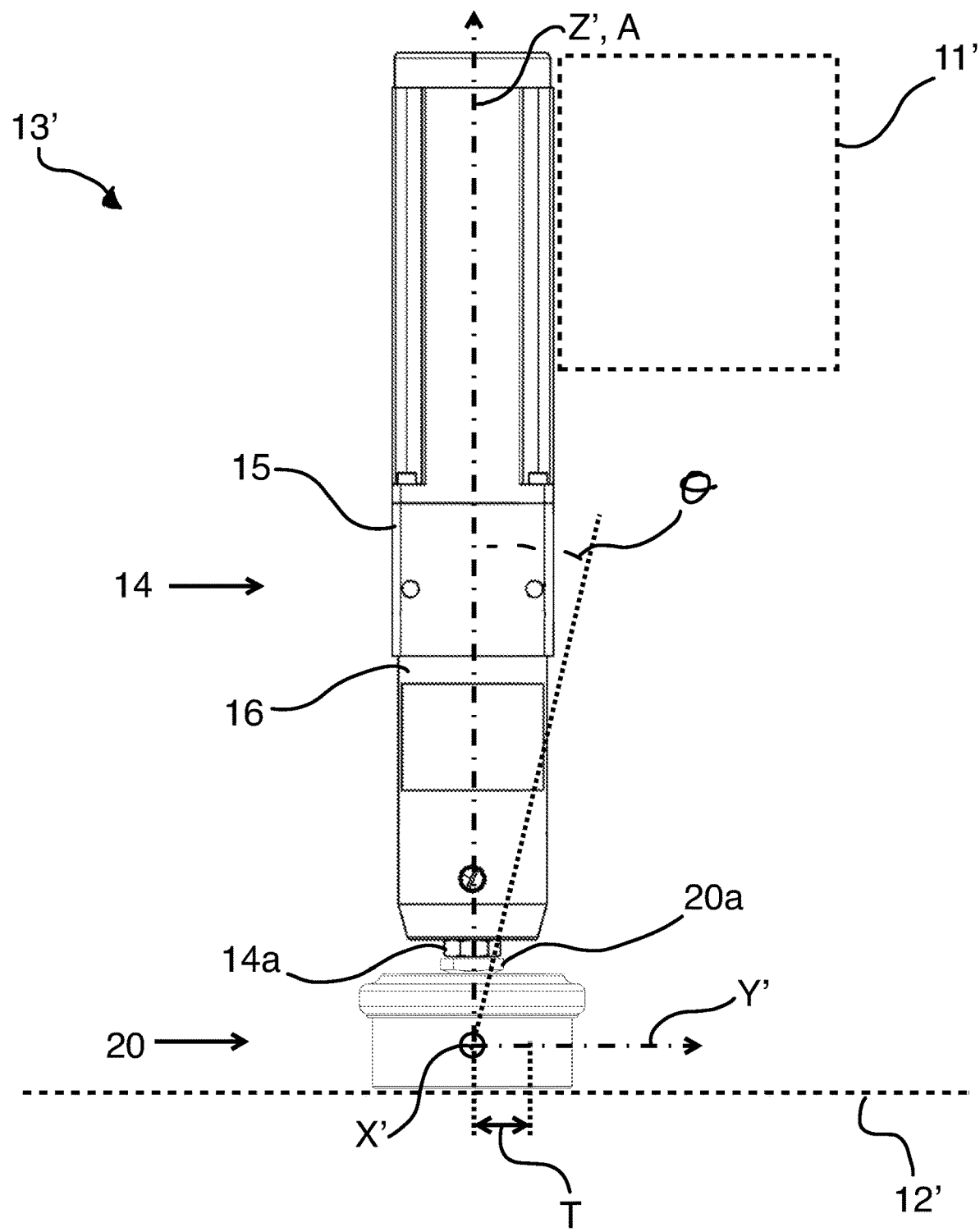
FIG. 2 is an elevation view of an actuator assembly of the present disclosure.

Turning to FIG. 2, an embodiment of an actuator assembly 13' according to the present technology will now be described, though the actuator assembly 13' may be equivalent to the actuator assembly 13. The actuator assembly 13' as shown may be provided as a component of a kit to convert a user-supporting structure such as those described hereinabove into an effector for a motion simulator. In other implementations, the actuator assembly 13' may be provided as a retrofit component to replace (and in some cases upgrade) a similar component of an existing motion simulator. The actuator assembly 13' comprises an actuator 14 and a joint assembly 20 together forming a linkage arranged to govern displacement between a given effector 11' and a corresponding reference structure 12'. The actuator 14 and the joint assembly 20 may respectively be connected to the effector 11' or to the reference structure 12' by way of appropriate attachment means such as mounting plates, brackets and fasteners. The actuator 14 is in this case an electro-magnetic linear actuator (e.g., a ball-screw type linear actuator) generally consisting of two collinear portions of translatable relative to one another, the pair being controllably displaceable relative to one another. The portions of the actuator 14 may be respectively referred to as a reference-side portion 15 (including a motor) and an effector-side portion 16 (including a piston) depending on their orientation (expression "effector-side" as it includes the driven side of the actuator 14). In the depicted embodiment, the reference-side portion 15 is movable with the end effector 11' and the effector-side portion 16 is constrained relative to the ground, or is in contact with the ground. It shall be noted however that the reverse configuration is also possible. The actuator 14 may instead be of a hydraulic or a pneumatic type. Examples of the actuator 14 may be as described in U.S. Pat. Nos. 9,664,227, 9,863,513, or U.S. Pat. No. 10,012,295, the contents of all of which are included herein by reference.

The actuator 14 may be kinematically coupled to either the reference structure 12' or the effector 11' by means of the joint assembly 20. To this effect, an actuator connector 14a of the actuator 14 complementary to a joint connector 20a of the joint assembly 20 may be provided either at the reference-side portion 15 or at the effector-side portion 16. In this embodiment, the actuator 14 has a connector 14a located proximate to a distal end of the effector-side portion 16. The actuator assembly 13' is shown in a neutral configuration, in which the joint assembly 20 is laid into a neutral plane defined by X'- and Y'-axes, to which a longitudinal A-axis of the actuator 14 extends in a neutral direction collinear to a Z'-axis orthogonal to the X' and Y'-axes. The joint assembly 20 allows a certain range of motion for the actuator 14 to be translated and/or rotated away from the neutral configuration such that its longitudinal axis A may be transversely offset (i.e., slid away from the Z'-axis parallel to the neutral plane) and/or rotated relative to the X'-axis or the Y'-axis. Such motion may result from loading conditions applied to the actuator assembly 13' either directly by actuation of its own corresponding actuator 14, or indirectly by actuation of another actuator of a same motion system and/or by a displacement of a center of mass of the effector 11' connected thereto. Indeed, it should be noted that the position and/or orientation of the actuator assembly 13' may change as it follows its connected effector 11'. Upon determining how the actuator 14 may be controlled to impart a certain effect to the effector 11', its position and/or orientation relative to the joint assembly 20 and the kinematics possible therebetween may be taken into account. Some of the structural characteristics of the joint assembly 20 to be detailed henceforth may aid in this regard.

Figure 3:
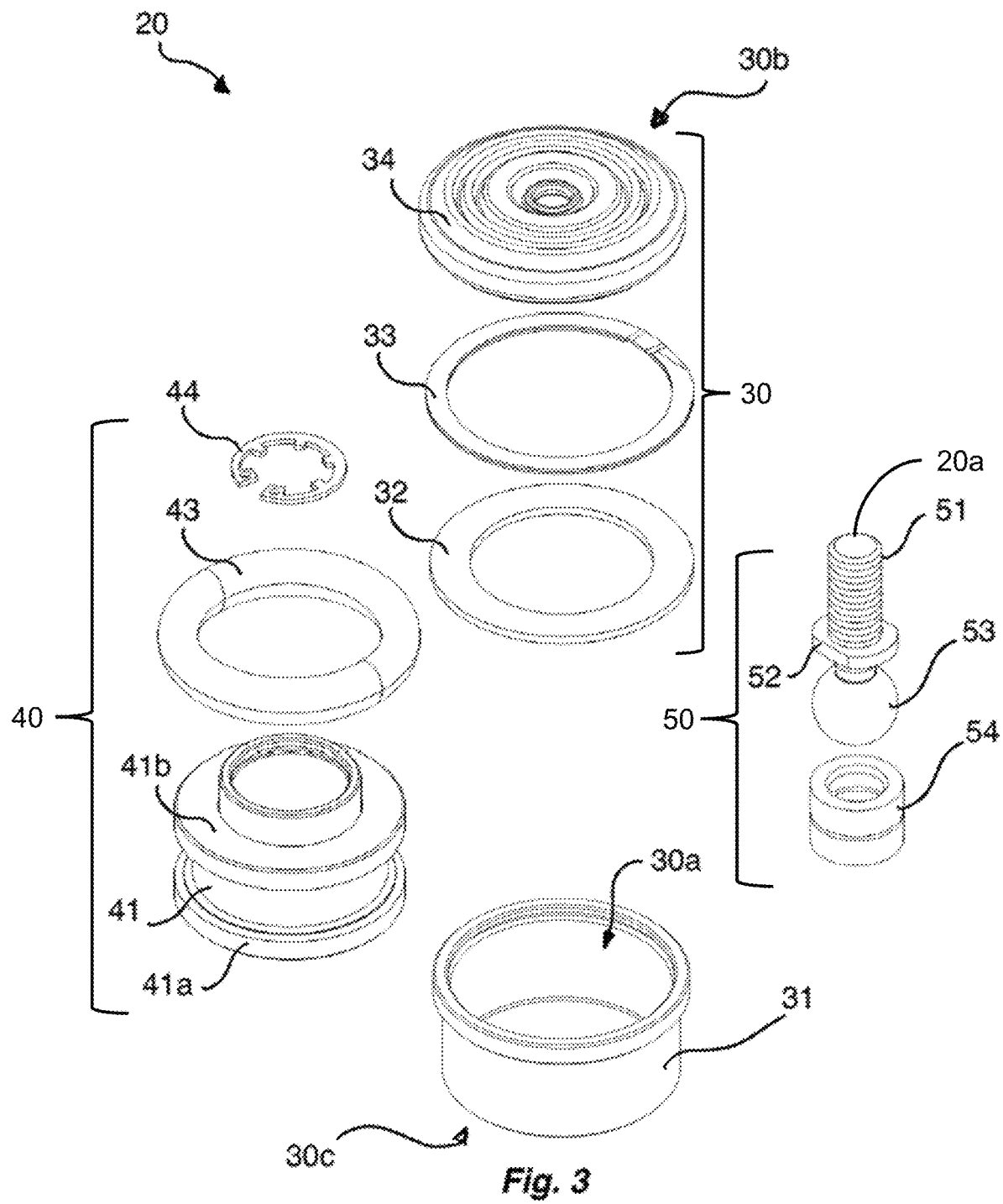
FIG. 3 is an exploded view of a joint assembly of the actuator assembly of FIG. 2, in accordance with a first embodiment.
Figure 4:
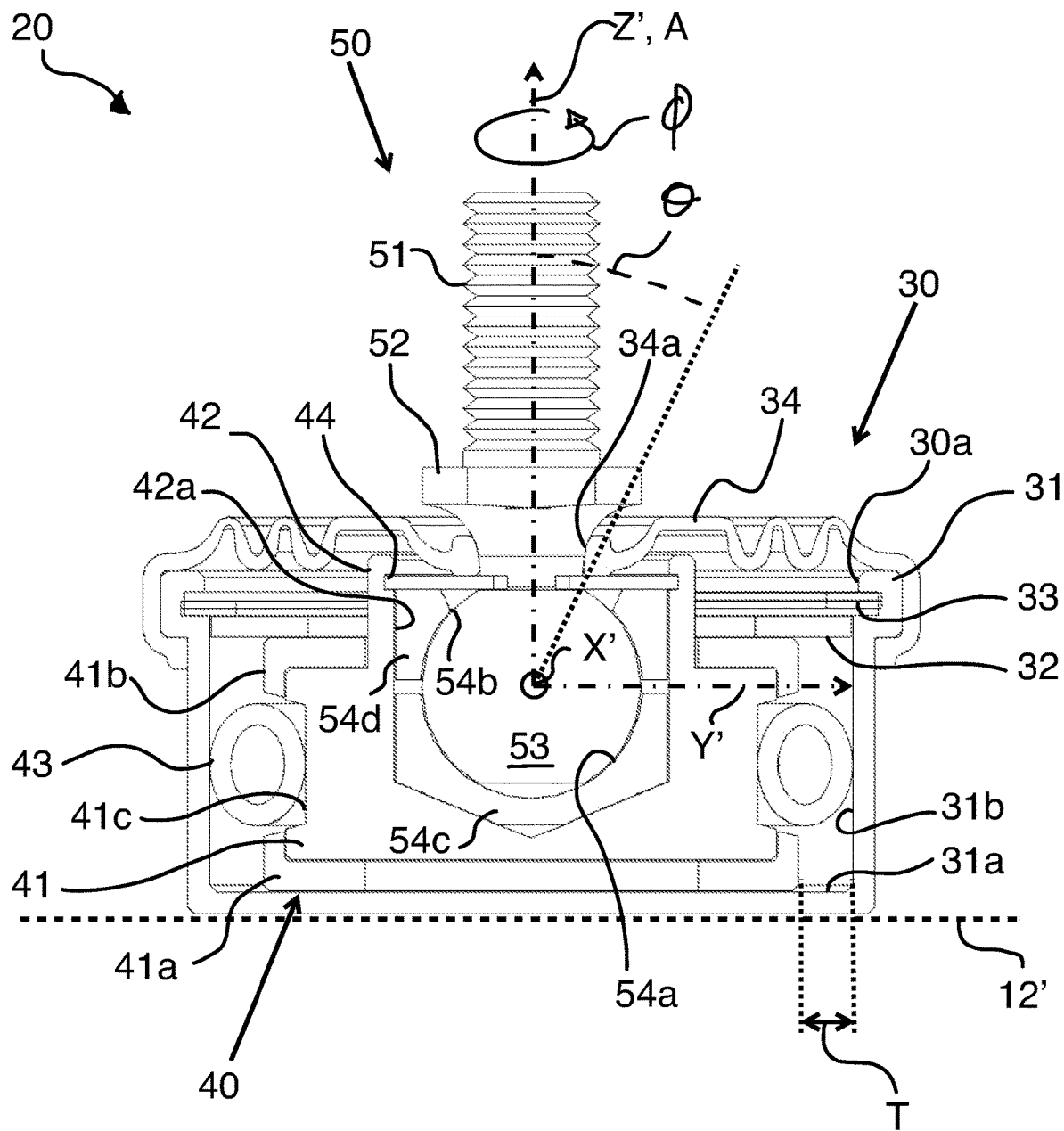
FIG. 4 is a section view of the joint assembly of FIG. 3, taken from a line orthogonal to a longitudinal axis of the joint assembly, in accordance with the first embodiment.

With respect to FIGS. 3 and 4, the joint assembly 20 will now be described in greater detail. The joint assembly 20 generally comprises a housing 30, a slider 40 movably connected to the housing 30 and a stud 50 movably connected to the slider 40 and connectable to the actuator 14 opposite the slider 40 (or to the base or ground or motion platform, while the housing 30 is mounted to the actuator 14).

The housing 30 may include a pot-like, open-ended cylinder, hollow casing 31 defining an interior cavity 31a inward of an opening of the casing 31 via which the slider 40 may be received. On the outside, the housing 30 has a cover portion 30b covering the opening, and a mounting portion 30c via which the housing 30 may be mounted to a reference structure. The mounting portion 30c may be or may include an underside of the housing 30, with fasteners that may couple the housing 30 to a structure. The housing 30 may also be laid freely to the ground in an embodiment (i.e., without fasteners). The housing 30 may also have a base wall that may include a coupling surface 31a generally parallel to the neutral plane (and in this case coplanar thereto) provided for interfacing a complementary coupling surface of the slider 40 to govern a translation motion of the slider 40. The coupling surface 31a may be in the form of a bottom of the interior cavity 31 oriented toward the opening. The coupling surface 31a may be substantially flat in an embodiment. The housing 30 also has a wall 31b that limits a range of the translation motion of the slider 40. The wall 31b is a generally cylindrical wall of the housing 30 extending upwardly from the bottom of the coupling surface 31a. The wall 31b may generally extend along the Z'-axis. The wall 31b does not hinder rotation of the slider 40 relative thereto. In this case, the coupling surface 31a and the interior surface of the wall 31b are integral to a cylindrical shape of the interior cavity 31, that may be obtained upon fabricating the housing 30 (e.g., casting, machining, etc). Other shapes and methods of shaping are contemplated for the interior cavity 31. As part of cover portion 30b, or as separate parts, the housing 30 may include a washer 32, a fastener 33 and/or a closure 34 with central opening 34a.

The slider 40 is nested inside the housing 30 so as to form a planar joint therewith having the capacity of translating along the X' axis and/or the Y' axis (FIG. 2), and of rotating about the Z' axis (one or two translational degrees of freedom (DOF) and one rotation DOF). Indeed, the casing 31 of the housing 30 is internally sized to an inner diameter and depth sufficient for it to receive a body 41 of the slider 40 therein, and allows its movements. The body 41 may have a pulley-like shape, i.e., a generally cylindrical body with an annular grooved rim that defines a pair of end flanges, as shown. Other shapes are considered, including plain cylindrical. A hub 42 of the slider 40 may optionally be present and may extend from the portion of the body 41 within the casing 31. If present, the hub 42 may project outside of the interior cavity 31 to slightly outside thereof, although other implementations may provide an arrangement allowing the slider 40 to be fully contained inside the casing 31. The hub 42 may define an inner cavity 42a, for coupling of the stud 50 to the slider 40, with a fastener 44 in an inner annular channel contributing to holding the stud 50 captive, as one possible way to hold the stud 50 captive. The body 41 is confined between the coupling surface 31a and a washer 32 sized relative to the housing 30 and to the slider 40. The washer 32 has an outer diameter generally corresponding to the inner diameter of the casing 31, and an inner diameter smaller than an outer diameter of the slider 40, but greater than the hub 42. The washer 32 may abut against the surface of the casing 31. A fastener 33, in this case an spiral ring (e.g. circlip) received in the inner annular channel in the casing 31 so as to extend from radially inward its inner diameter to outward thereof, is used to hold the washer 32 in place, and hold the slider 40 captive in the housing 30 yet free to move. In this position, the washer 32 forms another coupling surface for interfacing a second complementary coupling surface of the slider 40. The washer 32 and the fastener 33 may be described as a means for hindering translation of the slider 40 (and the actuator connector 14a joined thereto via the stud 50) out of the housing 30. The washer 32 and the fastener 33 are one possible way to define a receptacle for the slider 40, constraining the slider 40 to sliding movements in axes X' and Y', and to rotation about axis Y' (3 degrees of freedom (DOF), i.e., two translations and a rotation). Other solutions include screwing engagement of the housing 30 formed of two parts, using only the fastener 33, screwing a washer 32 into engagement with the casing 31, etc. There results the housing 30 having two sliding planes (currently shown as the bottom surface 31a and a surface of the washer 32), the sliding planes being parallel to a X'-Y' plane.

The body 41 of the slider 40 has a generally discoid shape, although other shapes may be used (e.g., ovoid) provided that they define adequate complementary coupling surface to that of the housing 30. The portions of the body 41 and of the casing 31 having the coupling surfaces may be constructed of a same material, such as steel, other metals or even composites, and be sized with suitable dimensional and geometrical tolerances. Nevertheless, either may be lined with a material different than that of the other to impart desirable properties to the planar joint in terms of performance and durability. For example, a low-friction material such as polytetrafluoroethylene (PTFE), nylon or others, could be paired with a metallic counterpart to obtain a planar joint having a suitable wear rate. Suitable low-friction materials may comprise additives such as graphite to render the part self-lubricating. Coatings and/or lubricants may also be used at joint interfaces. In this embodiment, the body 41 may have low-friction slider liners 41a, 41b respectively interfacing the first and second complementary coupling surfaces. The liners 41a and 41b may be annular in shape as shown. Also, it should be noted that the slider liners 41a, 41b are detachable from the body 41 so as to be replaceable as the need arises. The foregoing is merely one of the several configurations of the body 41 encompassed by the scope of the present technology.

The casing 31 and the slider 40 are sized such that a generally annular volume may be defined around the slider 40 and inward the wall 31b when the slider 40 is in the neutral configuration. In this configuration, a distance between the body 41 and the wall 31b may represent a range of the translation motion, shown by T in FIG. 4. A resilient member 43 may be disposed in the annular volume between the wall 31b and the body 41. In this implementation, the resilient member 43 is an integral piece having an annular shape. For example, the annular shape may be qualified as being a toroid (e.g. in its uncompressed native state), but may have other types of cross-sections, such as U, square, W, open polygonal, closed polygonal, etc. The resilient member 43 may be molded or fabricated out of an elastomeric material such as rubber. In an embodiment, the resilient member 43 is hollow, as shown (i.e., if it is a toroid, a toroidal inner cavity may be in the toroid and concentric with an outer surface thereof). Other suitable materials, shapes and methods for shaping are contemplated for the resilient member 43, including for example coil springs, rubber pads, etc. In this embodiment, a cross-section of the resilient member 43 has a diameter greater than the distance T. In such embodiments, the resilient member 43 may be said to be oversized, and may as a result either be compressed between the body 41 and the casing 31 and/or embedded inward a groove of either the body 41 (such as the groove 41c, if present) and/or of the casing 31. In an embodiment, a native state of the resilient member 43 (i.e., uncompressed, unloaded), may be such that the resilient member 43 must be compressed to be inserted between casing 31 and the body 41, though it is also contemplated to have the resilient member 43 uncompressed when in the neutral configuration of FIG. 4. The resilient member 43 may be arranged for biasing a remainder of the slider 40 toward the neutral configuration, for instance by having axisymmetry of the contacting surfaces of the casing 31, of the body 41, and of the resilient member 43. For example, the axisymmetry may be achieved with the casing 31 and the body 41 being cylindrical and/or having round cross-section along axis Z', and with the resilient member 43 being cylindrical. The axisymmetry may result in biasing forces from the resilient member 43 forcing the body 41 toward an origin, i.e., a position in which the slider 40 is concentric with the housing 30.

Absent external loads applied to the slider 40, the resilient member 43 may bias the remainder of the slider 40 into an initial position. Under certain circumstances, the initial position may correspond to the neutral configuration, such as upon the actuator assembly 13' being mounted vertically. Upon the actuator assembly 13' being mounted at an angle ⊖ relative to the Z'-axis, which may be due, for example, to the mounting portion 30c of the housing 30 being attached to an angled reference structure 12' and/or to the articulator 14 being configured such that it's A-axis is at the angle ⊖, the initial position may be offset relative to the neutral configuration. In some implementations of motion systems, a calibration system may be provided for sensing a position of the slider 40 to determine whether it corresponds to a predetermined initial position and to assess a need to adjust or replace a component of the joint system 20.

The stud 50 is nested in the slider so as to form a spherical joint therewith. The slider 40 has means for connecting to the stud 50, in this case the cavity 42a generally cylindrical in shape (other shapes possible), extending inward of the hub 42 and centered relative to the Z'-axis. Now regarding the stud 50, as best seen in FIG. 3, a proximal end thereof provided for connection to the slider 40 may comprise a detachable portion for connection to the actuator 14, though the stud 50 may be part of the actuator 14 or reference structure. The stud 50 may comprise a longitudinal member 51 having, at one end, a ball 53 and a ball liner 54 defining a socket 54a. Even though the expression ball 53 (or sphere) is used, item 53 may not be perfectly spherical, notably because of truncated portion as shown. The ball 53 is received by the ball liner 54 inward of an opening 54b thereof to inside its socket 54a. As an outer diameter of the ball 53 is greater than that of the opening 54b, the ball 53 may either be press-fit into the ball liner 54 or assembled otherwise. For instance, the ball liner 54 may be formed of a plurality of components 54c, 54d each forming a portion of the socket 54a. In the depicted embodiment, the ball liner 54 is formed of a bottom ball liner 54c and a top ball liner 54d sized to be successively stacked inside the cavity 42a of the slider 40. The ball 53 may be fastened to a shank 52 of the stud 50 (here defining a neck and a flange as it extends toward a distal end of the stud 50) so as to be detachable therefrom. The detached ball 53 may thus be received into the bottom ball liner 54c, the top ball liner 54d disposed onto the bottom ball liner 54c with the ball 53 cradled therebetween, and the shank 52 fastened to the ball 53 via the opening 54b. Other arrangements are possible. The ball liner 54 may be retained inside the cavity 42a of the slider 40 by the fastener 44, in this case a radially spring-loaded retaining ring (e.g., circlip) embedded in the slider 40 so as to extend from radially inward the cavity 42a to outward thereof, is used to hold the ball liner 54 in place. Other arrangements are possible for instance by having the body 41 having a screw cap. Upon the ball liner 54 being retained by the slider 40, a spherical joint is formed and the longitudinal member 51 may be rotatable with the ball relative to the ball liner 54 and the slider 40 by an angle between a range of 0 and 360 degrees, as represented by 4). The longitudinal member 51 may also be pivoted relative to the ball liner 54 and the slider 40 by the angle ⊖, here shown to represent a range of between 0 degree and about 45 degrees relative to the Z'-axis. The maximum value of the angle ⊖ may correspond to the angle at which the shank 52 (or other portion of the stud 50) comes into contact with another component of the joint assembly 20. In this case, such contact would occur between a neck of the shank 52 and a bevel of the top ball liner 54d.

The closure 34 of the housing 30, in this case an elastomeric boot, is shaped complementarily to the casing 31 and to the stud 50 so as to seal components of the planar and spherical joints of the joint assembly 20 inward the housing 30. The closure 34 extends radially outward from the stud 50 to a periphery of the casing 31. The closure 34 may be clipped onto the lip of the housing 30 that defines the inner annular channel for the washer 32 and the fastener 33. The central opening 34a of the closure 34 is arranged to follow the stud 50 as it moves relative to the casing 31, whereas a surrounding portion thereof is arranged to remain attached to the casing 31.

The ball 53 is typically constructed of a metal, while the ball liner 54 may be made with a low-friction material such as polytetrafluoroethylene (PTFE), nylon or others, could be paired with a metallic counterpart to obtain a joint having a suitable wear rate. Suitable low-friction materials may comprise additives such as graphite to render the part self-lubricating. Coatings and/or lubricants may also be used at joint interfaces. In this embodiment, the ball liner 54 is constructed of such low-friction material. The detachable arrangement of the ball liner 54 renders it replaceable as the need arises. The foregoing is merely one of the several configurations of the spherical joint encompassed by the scope of the present technology. While the ball liner 54 is being described as part of the stud 50, the ball liner 54 could be regarded as being part of the slider 40. Moreover, in the neutral configuration of the joint assembly 20, the cavity 42a, the ball liner 54 and the ball 53 may be part of the axisymmetric arrangement of the joint assembly 20 in the neutral configuration of FIG. 4, e.g., with the contact surfaces of the casing 31, slider 40 and resilient member 43.

The joint connector 20a may be integral to the distal end of the stud 50 or, as may be the case in certain implementations, be connectable thereto. In this embodiment, the joint connector 20a is integral to a portion of the stud 50 located outside the housing 30. The joint connector 20a may thus be a screw-like portion of the longitudinal member 51, for example a threaded shaft projecting from the flange 52. The actuator connector 14a may thus be a complementarily tapped bore extending inward the actuator 14, in which the joint connector 20a may be threadedly engageable up to a seated position, in which either the flange 52 or the end of the shaft 51 may be abutting there against.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims. For instance, a joint assembly need not be part of a motion simulator, and may interconnect two components that are not actuated. Further, a stud-like component may form an integral part of an actuator, and may thus be omitted from a complementary joint assembly. Moreover, the expressions bottom and top are used herein with reference to the use shown in FIG. 4. However, the joint assembly 20 may be used in an inverted configuration, for example with the housing 30 secured to a seat or motion platform. Accordingly, top and bottom must only be interpreted for giving a relative position between components.

The invention claimed is:

1. A joint assembly comprising:
    a housing having an inner wall surrounding an interior cavity of the housing,
    a slider held captive in the interior cavity of the housing so as to define an annular volume extending radially between the slider and the inner wall of housing, the slider constrained to planar movement and a rotational degree of freedom in the housing, and
    an annular resilient member in the annular volume, the annular resilient member exerting a biasing force between the slider and the housing toward a neutral configuration;
    wherein the housing is adapted to be connected to one of a ground/base/motion platform and a linear actuator, and the slider is adapted to be connected to the other of the ground/base/motion platform and the linear actuator, the annular resilient member being a toroid in an uncompressed state.

2. The joint assembly according to claim 1, wherein the toroid is hollow.

3. The joint assembly according to claim 1, wherein the annular resilient member is compressed in the neutral configuration.

4. The joint assembly according to claim 1, wherein the slider has a pulley body, the annular resilient member received in a grooved rim of the pulley body.

5. The joint assembly according to claim 1, wherein the slider has at least one annular liner for sliding engagement with a surface of the interior cavity of the housing.

6. The joint assembly according to claim 1, wherein the interior cavity has a cylindrical shape.

7. The joint assembly according to claim 6, wherein the housing includes a casing being an open-ended cylinder, the casing defining said inner wall.

8. The joint assembly according to claim 7, wherein a circlip is received in an annular groove defined in the inner wall of the casing.

9. The joint assembly according to claim 8, wherein a washer is held captive by the circlip in the interior cavity, and contacts the slider to hold the slider in the interior cavity.

10. The joint assembly according to claim 1, wherein the annular volume and the annular resilient member are axisymmetric.

11. The joint assembly according to claim 10, wherein the slider and the inner wall of the housing are concentric in the neutral configuration.

12. The joint assembly according to claim 1, wherein a stud is connected to the slider by a spherical joint.

13. The joint assembly according to claim 12, wherein the stud has a ball of the spherical joint.

14. The joint assembly according to claim 13, wherein the stud has a threaded rod projecting from the ball, the threaded rod adapted to be connected to the linear actuator.

15. The joint assembly according to claim 13, wherein the slider defines a socket for the ball.

16. The joint assembly according to claim 15, wherein ball liners are received in the socket and interface the slider with the ball.

17. The joint assembly according to claim 16, wherein a circlip holds the ball liners and the ball in the slider.

* * * * *